(12) United States Patent
Nishikawa et al.

(10) Patent No.: US 6,342,978 B1
(45) Date of Patent: Jan. 29, 2002

(54) PICKUP DEVICE FOR OPTICAL DISK

(75) Inventors: Masayuki Nishikawa, Higashiosaka; Tetsuo Iwaki, Yamatokoriyama, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/510,200

(22) Filed: Feb. 22, 2000

(30) Foreign Application Priority Data

Feb. 22, 1999 (JP) ............................................. 11-042796

(51) Int. Cl.⁷ ................................................. G02B 7/02
(52) U.S. Cl. ........................ 359/813; 359/814; 359/824; 369/44.15; 369/44.16; 369/247
(58) Field of Search ................................. 359/814, 813, 359/824, 811, 823; 369/44.14, 44.15, 44.16, 247

(56) References Cited

U.S. PATENT DOCUMENTS

| | | | |
|---|---|---|---|
| 5,007,712 A | * 4/1991 | Kikuchi et al. | 359/813 |
| 5,241,528 A | * 8/1993 | Mohri et al. | 369/44.15 |
| 5,640,279 A | * 6/1997 | Marino et al. | 359/823 |
| 5,724,197 A | * 3/1998 | Barnes et al. | 359/824 |
| 5,742,440 A | * 4/1998 | Marino | 359/814 |
| 5,768,034 A | * 6/1998 | Marino | 359/814 |

* cited by examiner

Primary Examiner—Loha Ben

(57) ABSTRACT

In accordance with the present invention a pickup device for optical disks includes spring wires supporting displaceably in focusing and tracking directions a lens holder holding an objective lens. One set of more than two spring wires is provided for each side of the lens holder and a total of two such sets of spring wires are arranged parallel to each other. Of more than two spring wires of each set, at least one spring wire has a cross section allowing a spring constant in the focusing direction and that in the tracking direction to vary from each other and is also positioned farther or closer than the remaining spring wires away or to a centerline of the objective lens. As such the pickup device can ensure a sufficient displacement in the focusing and tracking directions and also control an inclination of the lens holder.

10 Claims, 5 Drawing Sheets

PICKUP DEVICE FOR OPTICAL DISK

BACKGROUND OF THE INVENTION

1. Field of the Invention

The present invention relates generally to pickup devices for optical disks that are used in conjunction with optical storage and reproduction apparatuses, and in particular to an improvement in a lens supporting structure thereof.

2. Conventional Art

Conventionally, pickup devices for optical disks (referred to as "pickup devices" hereinafter) are typically driven electromagnetically, as shown in FIGS. 7 and 8. In FIGS. 7 and 8, an arrow X indicates a disk tangent direction, i.e., a direction of a tangent to a track at a recording or reproducing position of an optical disk (referred to as "the X direction" hereinafter). Arrows Y and Z indicate a focusing direction perpendicular to a surface of an optical disk on which data is recorded or reproduced (referred to as "the Y direction" hereinafter) and a tracking direction (referred to as "the Z direction" hereinafter), respectively.

The electromagnetically driven pickup device includes a lens holder 4 for holding an objective lens 1. Lens holder 4 has opposite side surfaces perpendicular to the X direction, each with a focusing coil 2 and a tracking coil 3 attached thereto. Opposite to focusing and tracking coils 2 and 3, magnetic-flux generation means corresponding to a magnet 5 is provided, with a magnetic gap 6 therebetween. A U-letter yoke 7 holding magnet 5 and a shielding plate 8 together form a magnetic circuit.

The pickup device also includes a base 9 with various parts positioned and arranged thereon. Base 9 has in the X direction one end with a stand 10 attached thereto. Between side surfaces of stand 10 perpendicular to the X direction and those of lens holder 4 perpendicular to the X direction, two pairs of two spring wires for a total of spring wires 11a–11d supporting lens holder 4 displaceably in the Y and Z directions are provided parallel to each other. Spring wires 11a–11d are rectangular in cross section and each have ends soldered, one to stand 10 and the other to a printed circuit board 12 mounted to lens holder 4.

More specifically, spring wires 11a–11d are processed to have a cross section to obtain a resonant frequency required for displacing lens holder 4 in the Y and Z directions. Furthermore, spring wires 11a–11d each have in the longitudinal direction thereof at a position other than its ends a bent portion 13 functioning as a vibration damping portion (a so-called damping portion), with a Visco Elastic Material (VEM) sheet 14 attached for providing an additional vibration damping property. "VEM" is a brand name of a product of 3M Company.

In accordance with the above description, spring wires 11a–11d provided between the side surfaces of stand 10 on base 9 and those of lens holder 4 each have a rectangular cross section, i.e., a cross section allowing a spring constant in the focusing or Y direction and that in the tracking or Z direction to vary from each other. However, spring wires 11a–11d are not limited to such cross section and there is also a pickup device with spring wires 11a–11d each having a round cross section. Such spring wires 11a–11d round in cross section have the same spring constant in the both Y and Z directions. Thus, a resonant frequency required for displacing lens holder 4 in the Y direction is equal to that required for displacing lens holder 4 in the Z direction.

The above conventional pickup device has such an inconvenience as described below: since spring wires 11a–11d rectangular in cross section are formed by etching, punching or the like, using as much as such four spring wires 11a–11d would inevitably result in an increased cost. Furthermore, forming bent portion 13 in each of four spring wires 11a–11d and attaching VEM sheet 14 to each of four spring wires 11a–11d are time-consuming in processing and assembling spring wires 11a–11d resulting in a further increased cost.

Furthermore, with spring wires 11a–11d each having bent portion 13, lens holder 4 tends to incline when it is displaced in the Y direction. Furthermore, in soldering spring wires 11a–11d to lens holder 4 and stand 10, spring wires 11a–11d, rectangular in cross section, must have their sides positioned parallel to the Y and Z directions, respectively. In doing so, it is difficult to avoid some error introduced when the wires are assembled, and such assembling error tends to result in a vibration which can in turn cause an inclination of lens holder 4, a signal degradation and the like. Furthermore, while for an optical recording medium of high density a lens with large numerical aperture is preferably used to improve signal quality, as a lens's numerical aperture is increased even a slight inclination of lens holder 4 would result in a large coma-aberration and thus increase a jitter which can degrade signal quality.

In contrast, if spring wires 11a–11d are round in cross section, their assembling errors can readily be controlled and lens holder 4 thus hardly inclines. However, spring wires 11a–11d round in cross section cannot have a spring constant in the Y direction and that in the Z direction that vary from each other. Thus it is difficult to provide a resonant frequency optimized for each direction. This would result in a limitation in miniaturizing the general configuration and reducing power consumption.

Furthermore, although not shown, the conventional pickup device has an objective lens and a magnetic head arranged opposite to each other with a recording disk posed therebetween. This requires that a beam directed from an actuator and a magnetism generating portion of the magnetic head be aligned with each other. As a result, the device's general configuration is increased in size and its number of parts and cost would be increased. Furthermore, currently it is desired that a magnetic head recording data at high density should have superior high-frequency characteristics and the magnetic head thus should be supplied with current through a conductor line with reduced loss or reduced resistance.

SUMMARY OF THE INVENTION

The present invention has been made to solve the conventional disadvantages described above and contemplates a pickup device having a configuration capable of controlling an inclination of a lens holder while ensuring a sufficient displacing property in focusing and tracking directions.

To achieve the above object the pickup device of the present invention in a first aspect includes a lens holder for holding an objective lens, focusing and tracking coils attached on a side surface of the lens holder in a disk tangent direction, a yoke holding a magnetic-flux generation means arranged opposite to the focusing and tracking coils, a spring wire supporting the lens holder displaceably in focusing and tracking directions, and a base with the lens holder and the yoke arranged thereon. This device is characterized in that two sets of more than two spring wires are arranged in parallel, one set for each side of the lens holder perpendicular to the tracking direction, wherein of more than two spring wires of each set, at least one spring wire has a cross section allowing a spring constant in the focusing direction and that in the tracking direction to vary from each other and is also positioned farther or closer than the other spring wires away from or to a centerline passing a center of the objective lens and running in the disk tangent direction.

As such, a total of more than five spring wires supporting the lens holder can provide a sufficiently strong lens-holder supporting structure. Furthermore, at least one of more than two spring wires of each set that has a cross section allowing a spring constant in the focusing direction and that in the tracking direction to vary from each other, allows a resonant frequency optimized for each of the focusing and tracking directions without increasing cost. Furthermore, the spring wire having a cross section allowing a spring constant in the focusing direction and that in the tracking direction to vary from each other, allows a larger spring constant in a direction of the objective lens's rotation around the centerline running in the disk tangent direction, than a spring wire having the same spring constant in the tracking and focusing directions. As a result, the lens holder can have a reduced inclination around such centerline.

The pickup device of the present invention in a second aspect has a lens holder for holding an objective lens, focusing and tracking coils arranged on a side surface of the lens holder perpendicular to a disk tangent direction, a yoke holding a magnetic-flux generation means arranged opposite to the focusing and tracking coils, a spring wire supporting the lens holder displaceably in focusing and tracking directions, and a base with the lens holder and the yoke arranged thereon. This pickup device is characterized in that two sets of more than two spring wires are provided, one set for each side of the lens holder perpendicular to the tracking direction, wherein of more than two spring wires of each set, at least one spring wire has a cross section allowing a spring constant in the focusing direction and that in the tracking direction to vary from each other and is also inclined in the tracking direction while the remaining spring wires are arranged such that the two sets of spring wires are parallel to each other.

As such, the spring wires having a cross section allowing a spring constant in the focusing direction and that in the tracking direction to vary from each other can provide an optimized resonant frequency without increasing cost and also reduce an inclination of the lens holder that is attributed to the objective lens's rotation around a centerline running in the disk tangent direction. Furthermore, the spring wires having a cross section allowing a spring constant in the focusing direction and that in the tracking direction to vary from each other and obliquely intersecting both the disk tangent direction and the tracking direction, can save more space and thus miniaturize the pickup device, since if a spring wire is arranged parallel to the disk tangent direction, increasing the wire's spring constant in a direction of the objective lens's rotation around the centerline running in the disk tangent direction, requires the spring wire to have a large interval in the focusing direction and/or the tracking direction, whereas if a spring wire obliquely intersects the disk tangent direction, it does not require such a large interval as described above and only requires a relatively small space while it also allows a large spring constant around the centerline running in the disk tangent direction.

In accordance with the present invention in the first and second aspects a pickup devices according to a preferable embodiment includes a vibration damping portion provided to a spring wire having a spring constant in the focusing direction and that in the tracking direction varying from each other. As such, a vibration that can cause an inclination of the lens holder, a signal degradation and the like hardly occurs.

In accordance with the present invention in the first and second aspects a pickup device according to another preferable embodiment includes a spring wire rectangular in cross section, having a spring constant in the focusing direction and that in the tracking direction varying from each other, and the remaining spring wires round in cross section. The spring wires round in cross section and larger in number than that rectangular in cross section can be readily formed and the cost therefor can thus be reduced. Furthermore, such spring wires round in cross section can be readily assembled and their assembling errors can thus be readily controlled.

In accordance with the present invention in the first and second aspects a pickup device according to a still preferable embodiment includes a lens holder holding an objective lens as well as a magnetic head, and more than two spring wires of each set, at least one spring wire used for supplying power to the magnetic head and the remaining wires used for supplying power to the focusing and tracking coils. As such, the objective lens and the magnetic head that are integrated together are situated opposite to an optical recording medium. This can eliminate the necessity of aligning them with each other and thus miniaturize the pickup device.

In accordance with the present invention in the first and second aspects a pickup device according to a still preferable embodiment includes a spring wire feeding power to the magnetic head that is formed of a material having a small electric resistance. As such, power loss and hence power consumption can be advantageously reduced.

As described above, in spite that in the present invention a pickup device uses a total of more than five spring wires of which only at least two spring wires have a cross section allowing a spring constant in the focusing direction and that in the tracking direction to vary from each other, the pickup device can ensure a sufficient displacement of the lens holder in each of the focusing and tracking directions while controlling the lens holder's inclination and thus provide a resonant frequency optimized without such a cost as otherwise increased as conventional. As such, the focusing and tracking coils displacing the lens holder can effectively consume less power and the coils' turn counts and the magnet's size can be effectively optimized, and, with the pickup device having its general configuration miniaturized, power consumption can also be effectively reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, pickup devices of preferred embodiments of the present invention will be described with reference to the drawings.

First Embodiment

Figure 7:
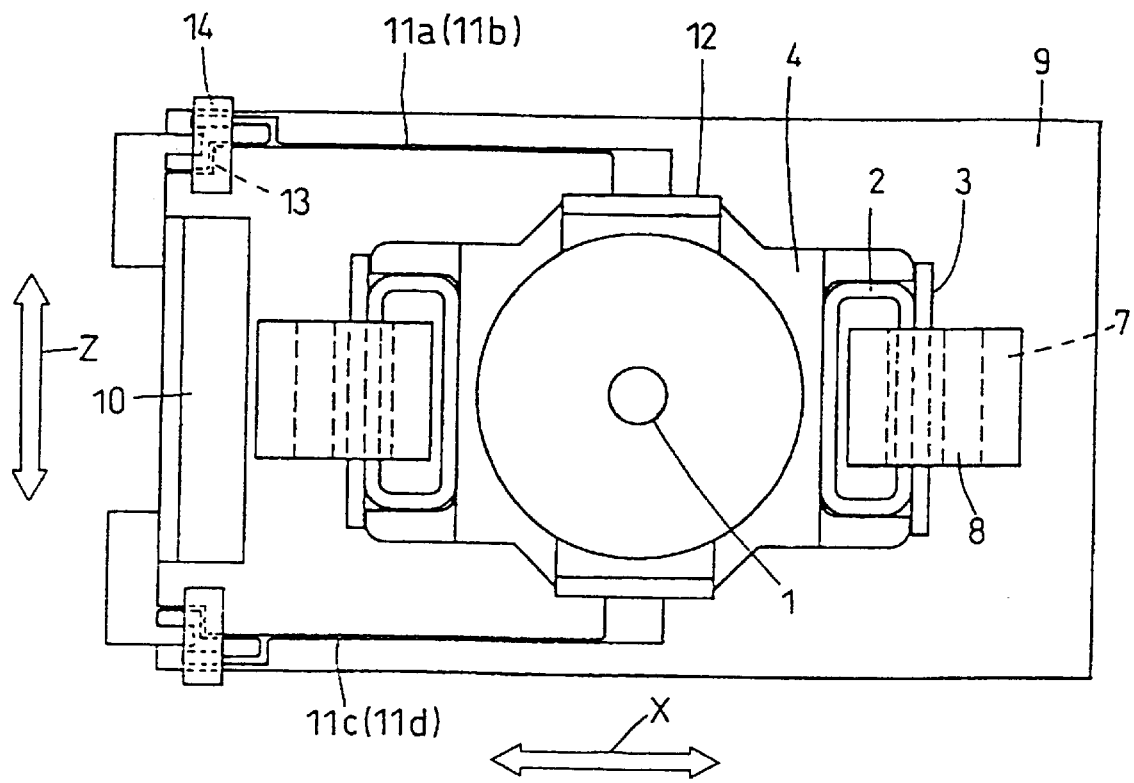
FIG. 7 is a planar view of a configuration of a conventional pickup device.
Figure 8:
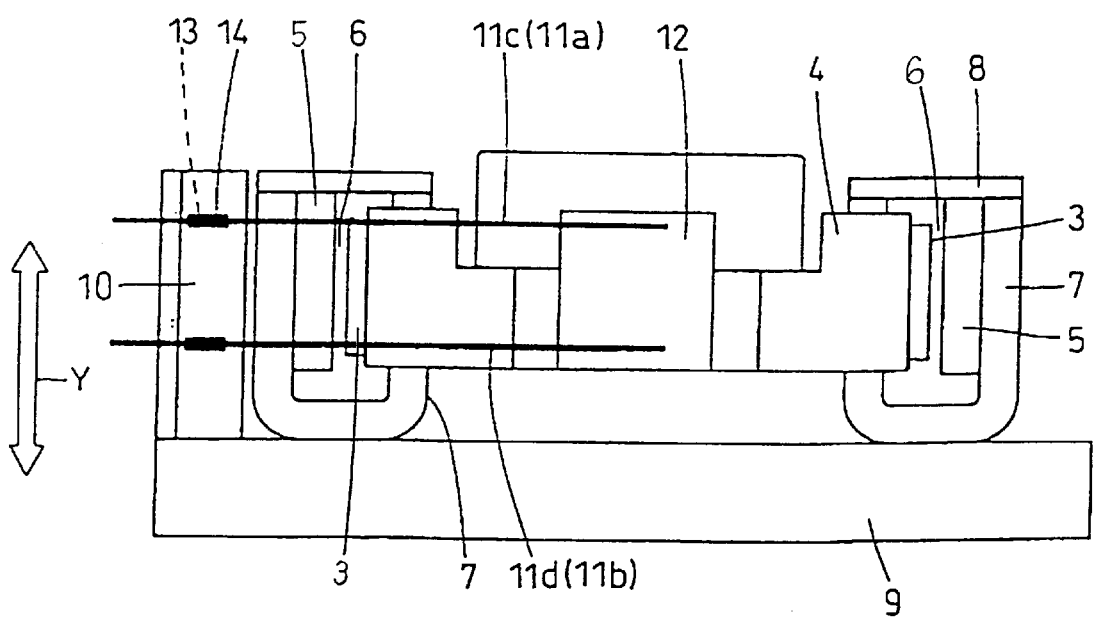
FIG. 8 is a side view of the FIG. 7 conventional pickup device, as seen at a front side in the tracking or Z direction.

The first embodiment will initially be described with reference to FIGS. 1–4. It should be noted that the pickup device is basically the same in general configuration as the above conventional example and identical or corresponding components in the FIGS. 1–4 device and the FIGS. 7–8 conventional example are denoted by the same reference characters and a description thereof will not be repeated. It should also be noted that in FIGS. 1 and 2, arrows X, Y and Z respectively indicate a disk tangent direction, a focusing direction and a tracking direction, as in the conventional example described with reference to FIGS. 7 and 8.

Figure 1:
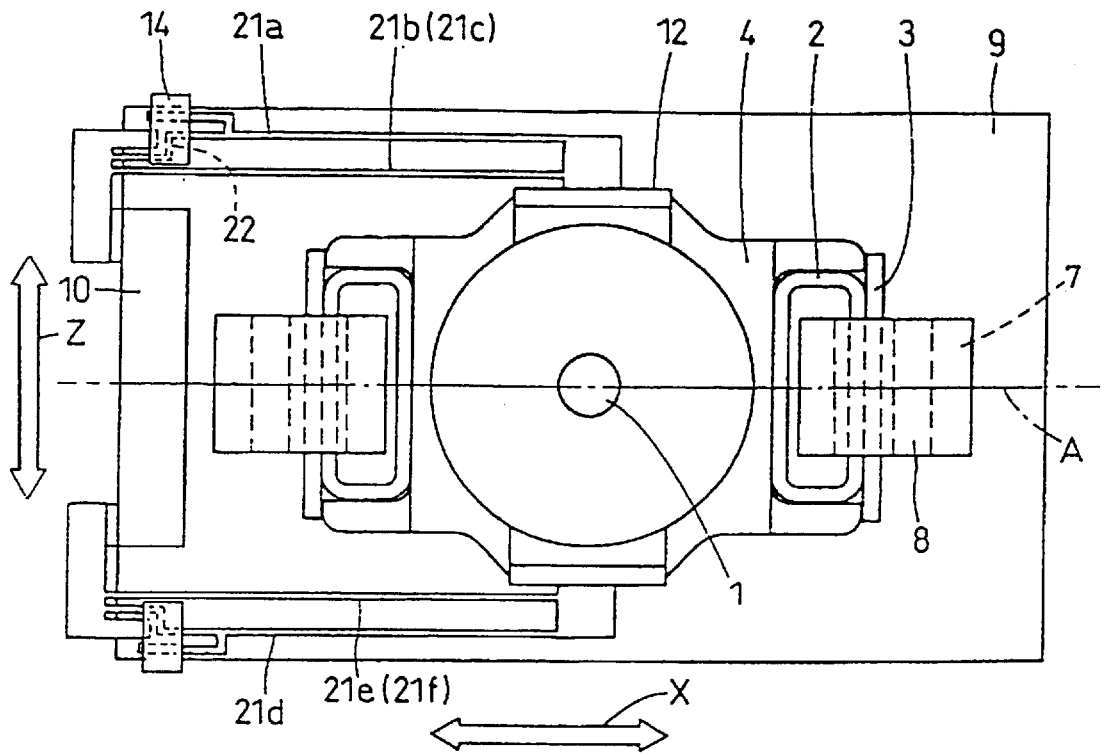
FIG. 1 is a planar view of a configuration of a pickup device of a first embodiment of the present invention.
Figure 2:
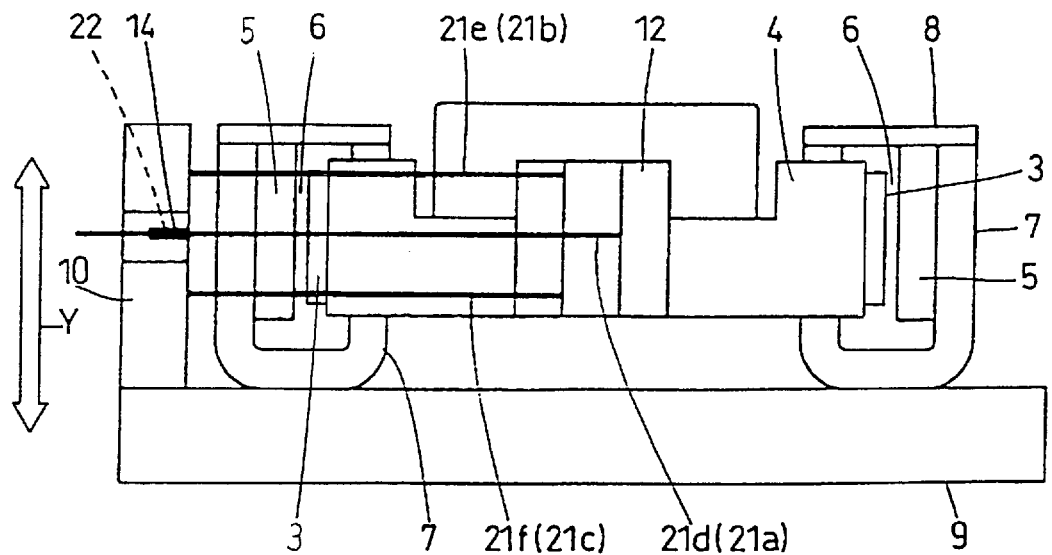
FIG. 2 is a side view of the FIG. 1 pickup device, as seen at a front side in a tracking or Z direction.

The pickup device of the first embodiment of the present invention, as shown in FIGS. 1 and 2, includes a lens holder holding an objective lens 1, focusing and tracking coils 2 and 3 attached to lens holder 4 at opposite side surfaces thereof perpendicular to the X direction, a U-letter yoke 7 holding a magnet 5 corresponding to a magnetic-flux generation means arranged opposite to focusing and tracking coils 2 and 3 with a magnetic gap 6 therebetween, a shielding plate 8 integrated with yoke 7 to form a magnetic circuit and also controlling a displacement in the focusing of Y direction, a total of six spring wires 21a–21f supporting lens holder 4 displaceably in the Y and Z directions, and a base 9 with the above-described elements positioned and arranged thereon.

Spring wires 21a–21f are divided into a total of two sets of three spring wires, each set provided between a side surface of a stand 10, which is attached on base 9 at one end in the X direction, in the X direction and a side surface of lens holder 4 in the X direction. More specifically, in the present embodiment, spring wires 21a–21f are divided in two sets of three spring wires, one set for each side of lens holder 4 perpendicular to the tracking or Z direction, and spring wires 21a–21f are also arranged parallel to each other. It should be noted that spring wires 21a–21f each have ends soldered to a printed circuit board 12, which is attached to lens holder 4, and stand 10, respectively. Of six spring wires 21a–21f, four spring wires are used for feeding power to focusing and tracking coils 2 and 3.

Furthermore, in the sets of three spring wires, spring wires 21a and 21d each have a rectangular cross section allowing a spring constant in the focusing direction and that in the tracking direction to vary from each other while the remaining spring wires 21b, 21c, 21e, 21f have a round cross section. Spring wire 21a is provided between spring wires 21b and 21c and spring wire 21d is provided between spring wires 21e and 21f, and spring wires 21a and 21d are positioned farther than spring wires 21b, 21c, 21e, 21f away from a centerline A passing the center of the objective lens and running in the X direction.

While the present embodiment employs two sets of three spring wires, it may also use two sets of more than three spring wires for a total of more than six spring wires. Furthermore, while spring wires 21a and 21d are adapted to be rectangular in cross section, it may also for example be generally oval in cross section. Furthermore, of more than two spring wires of each set, only at least one spring wire is required to be rectangular, generally oval or the like in cross section.

Furthermore, spring wires 21a and 21d rectangular, generally oval or the like in cross section that are positioned farther than the remaining spring wires 21b, 21c, 21e, 21f round in cross section away from centerline A of objective lens 1, increase a spring constant in a direction of the lens holder's rotation around centerline A. As a result, lens holder 4 advantageously has a reduced inclination and is thus applicable to lenses of large numerical apertures.

Furthermore, spring wires 21b, 21c, 21e, 21f round in cross section and larger in number than spring wires 21a, 21d can be readily formed and thus the cost therefor can be reduced. Furthermore they can also be readily assembled and as a result an advantage is ensured that their assembling errors can be readily controlled. Furthermore, spring wires 21a and 21d each has in a longitudinal direction thereof at a location other than their ends a bent portion 22 formed to function as a so-called damping portion (i.e., a vibration damping portion) and bent portion 22 is also provided with a VEM sheet 14 attached thereto for applying an additional vibration damping property. With such bent portion 22 and in addition VEM sheet 14 attached thereto, spring wires 21a and 21d rectangular in cross section hardly vibrate. This can advantageously suppress an inclination of lens holder 4, a signal degradation, and the like. It is needless to say that VEM sheet 14 may by replaced with any other type of sheet of visco-elastic material.

Figure 3:
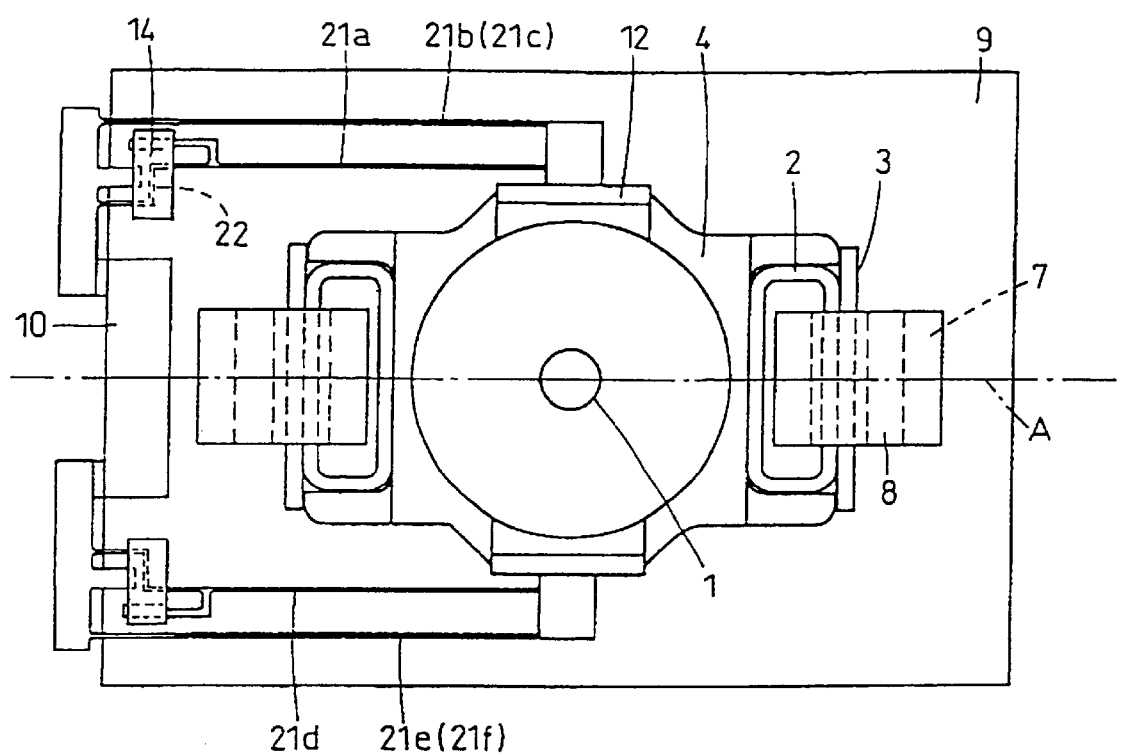
FIG. 3 is a planar view of a configuration of a modification of the pickup device of the first embodiment of the present invention.

In the present embodiment, of spring wires 21a–21f organized into two sets of three spring wires, spring wires 21a and 21d, one for each set, i.e., those having a rectangular cross section allowing a spring constant in the focusing direction and that in the tracking direction to vary from each other are positioned farther than spring wires 21b, 21c, 21e, 21f away from centerline A of objective lens 1. The present embodiment is, however, not limited to such configuration. More specifically, as in a pickup device as a modification of the first embodiment as shown in FIG. 3, spring wires 21a and 21d may be positioned closer than spring wires 21b, 21c, 21e, 21f to centerline A. Such configuration can also increase a spring constant in a direction of the lens holder's rotation around centerline A. Thus, lens holder 4 advantageously has a reduced inclination and is thus applicable to lenses of large numerical apertures.

Figure 4:
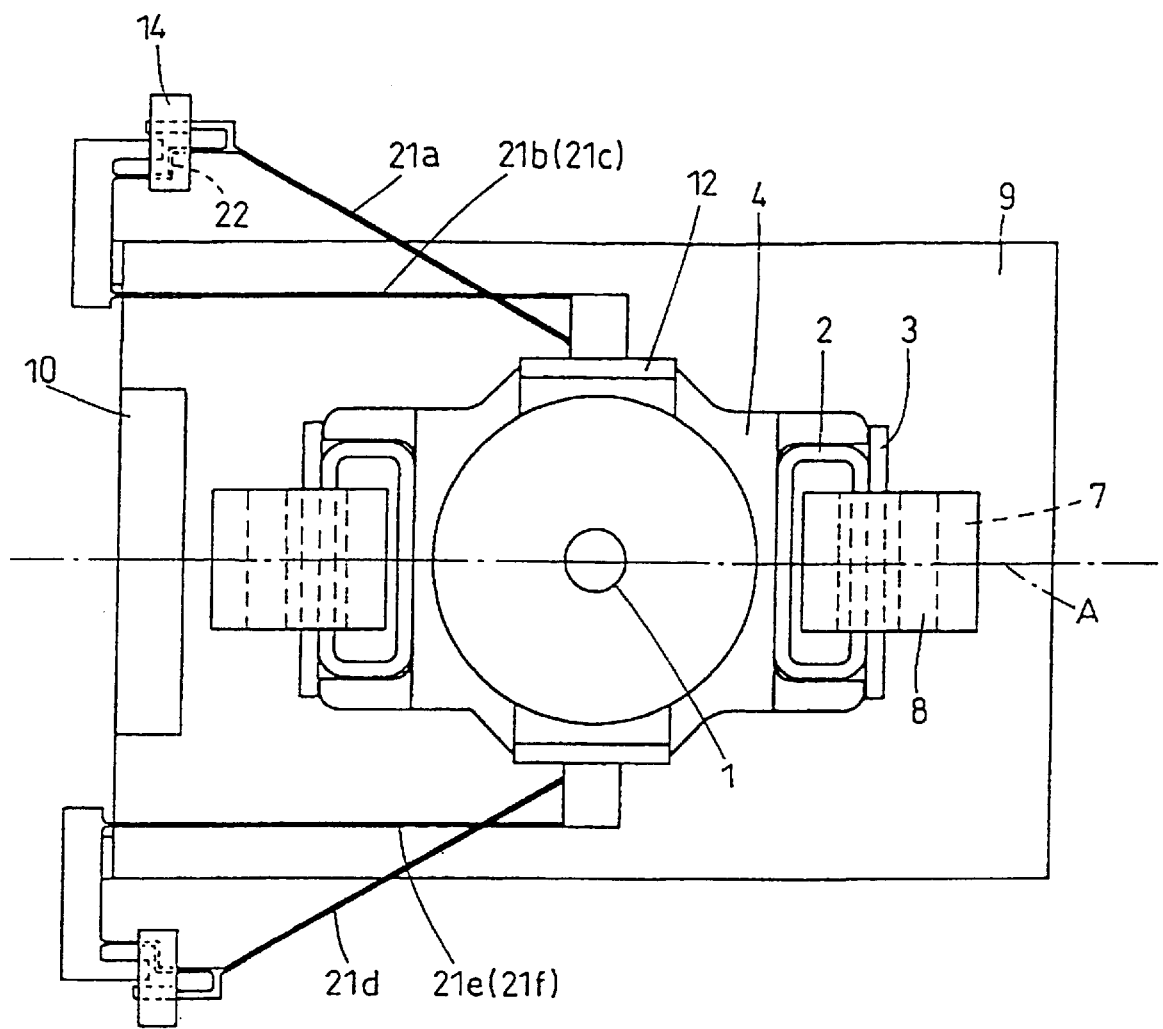
FIG. 4 is a planar view of a configuration of another modification of the pickup device of the first embodiment of the present invention.

Furthermore, as shown in another modification shown in FIG. 4, spring wires 21a and 21d rectangular in cross section may each obliquely intersects both the disk tangent direction and the tracking direction while the remaining spring wires 21b, 21c, 21e, 21f, two for each set, may be arranged such that the two sets of spring wires are parallel to each other. Such configuration can not only reduce an inclination of lens holder 4 rotating around centerline A of optical lens 1, but also save space and thus miniaturize the pickup device.

Second Embodiment

Figure 5:
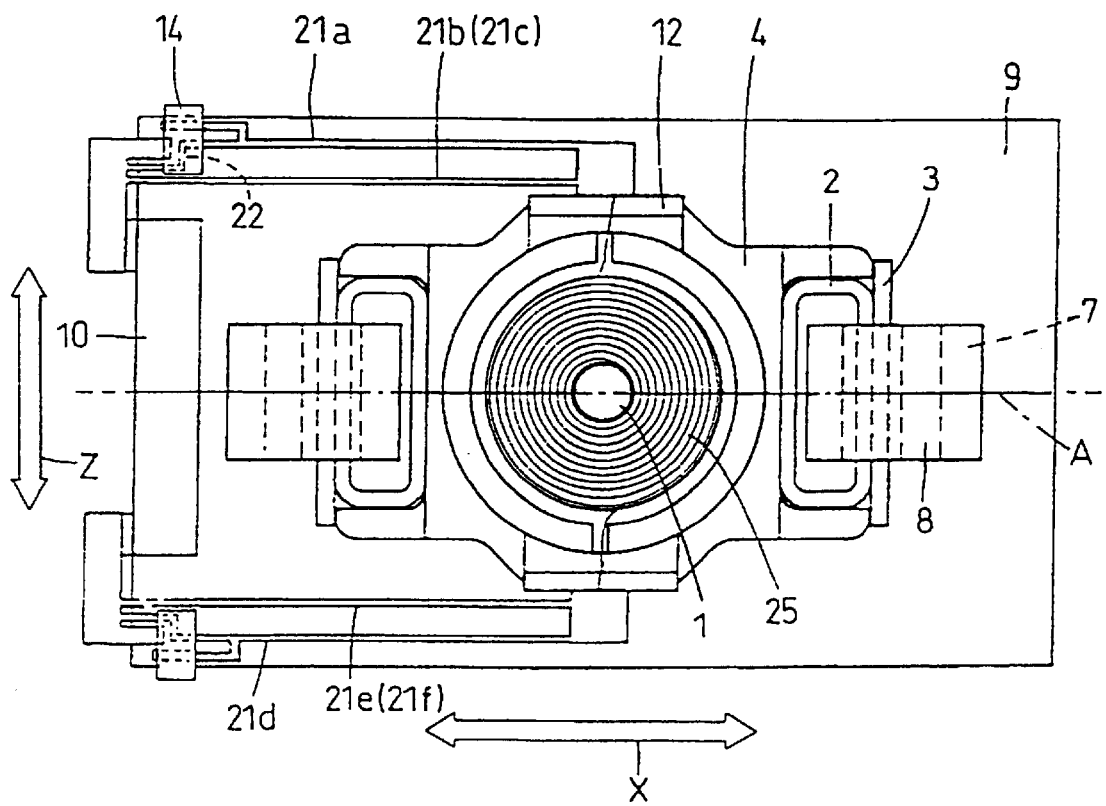
FIG. 5 is a planar view of a configuration of a pickup device of a second embodiment of the present invention.
Figure 6:
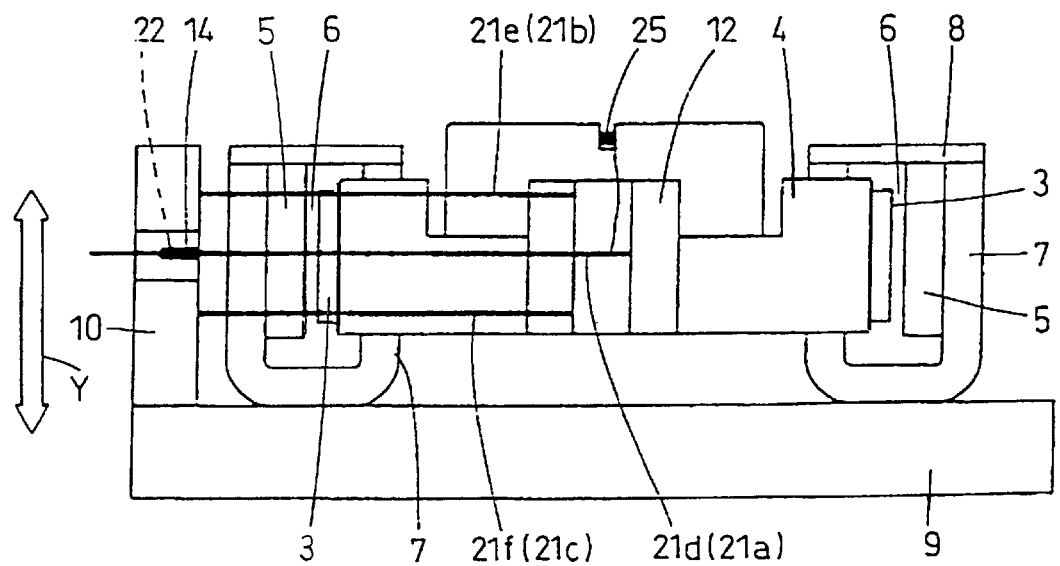
FIG. 6 is a side view of the FIG. 5 pickup device, as seen at a front side in the tracking or Z direction.

Reference will now be made to FIGS. 5 and 6 to describe a configuration of a pickup device of a second embodiment of the present invention. It should be noted that the pickup device of the present embodiment is basically similar in general configuration to the conventional example described with reference to FIGS. 7 and 8 and the first embodiment and identical or corresponding elements in the present embodiment in FIGS. 5 and 6 and the FIGS. 7 and 8 conventional example are denoted by same reference characters and a description thereof will not be repeated. In FIGS. 5 and 6, arrows X, Y, Z indicate the same directions as those in the conventional example described with reference to FIGS. 7 and 8.

The pickup device of the present embodiment is the same in configuration as the first embodiment in that spring wires 21a–21f, three for each set for a total of two sets of such spring wires, are attached to lens holder 4 on opposite side surfaces thereof, spring wires 21a and 21d, one for each set, having a rectangular cross section allowing a spring constant in the focusing or Y direction and that in the tracking or Z direction to vary from each other. Lens holder 4 holds objective lens 1 and a magnetic head 25 for applying a magnetic field to an optical recording medium (not shown) while not preventing a beam directed from objective lens 1.

In the present embodiment, spring wires 21a–21f each having ends soldered to printed circuit board 12, attached to lens holder 4, and stand 10, respectively, and spring wires 21a and 21d rectangular in cross section feed power to magnetic head 25 via printed circuit board 12 while spring wires 21b, 21c, 21e, 21f round in cross section feed power to focusing and tracking coils 2 and 3. As such, objective lens 1 and magnetic head 25 integrated together face an optical recording medium. This can eliminate the necessity of aligning them with each other and thus miniaturize the pickup device.

Preferably, spring wires 21a and 21d feeding power to magnetic head 25 are formed of a highly conductive material, such as an alloy of beryllium and steel. Spring wires 21a and 21d of such material allow magnetic head 25 to have less current loss. It is not necessary to say that the other spring wires 21b, 21c, 21e, 21f may also be formed of a similar material.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pickup device for an optical disk, comprising:
    a lens holder disposed to hold an objective lens;
    a focusing coil and a tracking coil arranged on a side surface of said lens holder along a disk tangent direction;
    a yoke disposed to hold magnetic-flux generation means arranged opposite to said focusing and tracking coils;
    spring wires supporting said lens holder displaceably in a focusing direction and a tracking direction; and
    a base with said lens holder and said yoke arranged thereon; wherein:
        said spring wires are divided in two sets arranged in parallel, one set of more than two spring wires for each side of said lens holder perpendicular to the tracking direction;
        of said more than two spring wires of each set, at least one spring wire has a cross section allowing a spring constant in the focusing direction and that in the tracking direction to vary from each other and is positioned farther or closer than the remaining spring wires away from or to a centerline of said objective lens running in the disk tangent direction.

2. The pickup device of claim 1, wherein said at least one spring wire having a spring constant in the focusing direction and that in the tracking direction varying from each other has a vibration damping portion.

3. The pickup device of claim 1, wherein said at least one spring wire having a spring constant in the focusing direction and that in the tracking direction varying from each other is rectangular in cross section and the remaining spring wires are round in cross section.

4. The pickup device of claim 1, wherein said lens holder also holds a magnetic head, of said more than two spring wires of each set, at least one spring wire feeding power to said magnetic head and the remaining spring wires feeding power to said focusing and tracking coils.

5. The pickup device of claim 4, wherein said spring wire feeding power to said magnetic head is formed of a highly conductive material.

6. A pickup device for an optical disk, comprising:
    a lens holder disposed to hold an objective lens;
    a focusing coil and a tracking coil arranged on a side surface of said lens holder perpendicular to a disk tangent direction;
    a yoke disposed to hold magnetic-flux generation means arranged opposite to said focusing and tracking coils;
    spring wires supporting said lens holder displaceablely in a focusing direction and a tracking direction; and
    a base with said lens holder and said yoke arranged thereon; wherein:
        said spring wires are divided in two sets, one set of more than two spring wires for each side of said lens holder perpendicular to the tracking direction; and
        of said more than two spring wires of each set, at least one spring wire has a cross section allowing a spring constant in the focusing direction and that in the tracking direction to vary from each other and is also obliquely intersecting both the disk tangent direction and the tracking direction while the remaining spring wires are arranged such that said two sets of spring wires are arranged parallel to each other.

7. The pickup device of claim 6, wherein said at least one spring wire having a spring constant in the focusing direction and that in the tracking direction varying from each other has a vibration damping portion.

8. The pickup device of claim 6, wherein said at least one spring wire having a spring constant in the focusing direction and that in the tracking direction varying from each other is rectangular in cross section and the remaining spring wires are round in cross section.

9. The pickup device of claim 6, wherein said lens holder also holds a magnetic head, of said more than two spring wires of each set, at least one spring wire feeding power to said magnetic head and the remaining spring wires feeding power to said focusing and tracking coils.

10. The pickup device of claim 9, wherein said spring wire feeding power to said magnetic head is formed of a highly conductive material.

* * * * *